May 10, 1949.  J. G. CAPSTAFF  2,469,915
APPARATUS FOR HANDLING MOTION-PICTURE FILM
Filed April 20, 1945  2 Sheets-Sheet 1

JOHN G. CAPSTAFF
INVENTOR

BY
ATTORNEYS

May 10, 1949.    J. G. CAPSTAFF    2,469,915
APPARATUS FOR HANDLING MOTION-PICTURE FILM
Filed April 20, 1945    2 Sheets-Sheet 2

JOHN G. CAPSTAFF
INVENTOR

BY
ATTORNEYS

Patented May 10, 1949

2,469,915

UNITED STATES PATENT OFFICE 2,469,915

APPARATUS FOR HANDLING MOTION-PICTURE FILM

John G. Capstaff, Rochester, N. Y., assignor to Eastman Kodak Company, Rochester, N. Y., a corporation of New Jersey Application April 20, 1945, Serial No. 589,326

24 Claims. (Cl. 271—2.6)

1

The present invention relates to a process and apparatus for successively transferring emulsion layers of a multi-layer perforated photographic film to separate perforated transparent transfer-films or supports, and also to sprocket means for bringing the perforations of both films into exact registration longitudinally; and, along at least one edge of the films, into exact lateral registration. These are particularly intended for the purpose and in the structures of the type shown and described in my copending applications Nos. 453,949 (which has been abandoned), and 488,672 (now Patent No. 2,417,060), filed August 7, 1942, and May 27, 1943, respectively, and constituting improvements thereover, the multi-layer film being shown in a patent of G. M. Nedeau, and C. B. Stark, and myself, No. 2,367,665, granted January 23, 1945.

Referring particularly to my application, Serial No. 488,672, the structure herein disclosed may be considered as a specific embodiment of and an improvement on the structure therein disclosed, the fundamental common features being the preliminary registration of the films on a braked sprocket or sprockets, followed by a roll-down, this, in turn, being followed by accurate registration on a second sprocket or sprockets. In the present structure, a series of sprockets is substituted for a single sprocket in order to distribute the pull over several perforations, the second registering sprockets are shown as out of the bath and are driven, thus combining the functions of the second registering sprocket and the upper driving sprocket of my earlier application. And, as a most important feature of difference, I have substituted for the teeth dimensioned to fill the perforation accurately, teeth which are individually split and the portions thereof spring pressed apart. The reasons for and advantages inherent in, these changes are fully explained hereinafter.

In said applications and patent, apparatus and methods are shown and described by which several of the various emulsion layers of a multi-layer color film are successively transferred to separate transfer-films or supports. This transfer is made before development, and produces three separate supports each of which carries one of the emulsion layers of the original multi-layer film. When such transfers are made, it is essential that the support to which the transfer is to be made and the layer which is to be transferred are properly positioned or registered.

As is well known by those in the motion-picture film art, two films are never exactly alike nor

2 do they have perforations which are of exactly the same pitch. This pitch difference is due to the differences in shrinkage of the films, and variations in the compositions of the film supports. When a film has been in the field for some time, or has been subjected to unusually dry atmospheric conditions, it may become dry and shrink excessively. It is not uncommon to find films mhich have a shrinkage of 0.2 per cent. This shrinkage may be due either to the loss of moisture or the loss of plasticizer or both. It is often found, particularly with old film, that this loss of plasticizer results in a permanent shrinkage of the film.

The multi-layer film is usually older than the transfer film, and may have been subjected to unusual conditions of dryness and may, therefore, have shrunk much more than the transfer film which is stored under controlled moisture conditions. Under such circumstances, obviously, the perforation pitches of the two films are not exactly the same. However, even under the best conditions, the films will not be exactly alike and the perforation pitches will not coincide. If the multi-layer film is not too bad, it may be restored substantially to its original condition by passage thereof through a conditioning cabinet of the type shown and described in my copending application 488,672. This conditioning cabinet will usually bring back the multi-layer film to its standard condition of about 0.01 per cent shrinkage. If, however, the multi-layer film is old and has permanently shrunk, or has been subjected to unusual conditions, as shown by the film history, it may be necessary to provide a pre-conditioning treatment prior to the passing of the film through the usual conditioning cabinet. In extreme cases, even the pre-conditioning may not be sufficient to return the multi-layer film to its required condition. In such a case, it may be necessary to use transfer films having a special perforating pitch which, of course, must be within the limits which the machine is designed to handle.

In the table of tolerances of the Society of Motion Picture Engineers, the smallest tolerance of standard motion picture film is that of the film perforations, and such tolerance is plus or minus 0.0004 inch. It will be apparent, therefore, that the most accurate registration of the film can be secured by simultaneously stretching the two films to thus bring the perforations of multi-layer film and also those of the transfer film or support into exact registration. Thus the desired result can be secured by means of the perforations only.

In the applications referred to, the registration was secured by providing a sprocket, band, or drum, with solid teeth which exactly and completely fill the film and support perforations along one edge. It is obvious, however, that such teeth, even if accurately and precisely formed, wear in service and do not always give the desired exact and accurate registration. Also, such solid teeth would, of necessity, have to be made of such a size as to fit a perforation of minimum size. If both perforations are the minimum size, perfect registration can be secured with such solid teeth, but if either film has a larger perforation, the registration will be out. Such solid teeth would not, therefore, be suitable for perforations which differ, even within permissible tolerance, from said minimum size. Hitherto, as in said above-mentioned applications, and other apparatus such as contact printers, such registration has been obtained by dimensioning one row of sprocket teeth to a standard size to fill a standard film perforation transversely and registering the film laterally by these teeth with the teeth of the other row made narrower than the film perforations to allow for some departure from the standard because of film shrinkage, longitudinal registration being secured by slight film tension.

The present invention overcomes these objections by securing the exact registration of the multi-layer film and the various supports or transfer films by means of the perforations only. This is obtained by providing a plurality of film engaging sprockets which cooperate in securing the desired longitudinal and lateral registrations simultaneously. In one form of the invention, each sprocket is provided with a row of solid teeth along one edge and a row of laterally expansible teeth along the other edge. The row of solid teeth and the fixed portions of the expansible teeth of the various sprockets cooperate to stretch or tension the two films to bring the two rows of perforations thereof into exact longitudinal registration along the two edges thereof, while the laterally expansible teeth serve to bring the rows of perforations along one edge only of the two strips into proper lateral registration. Thus, one row of the film perforations of two strips is registered only in one direction, namely, longitudinally, while the other row of perforations is registered in two directions, namely, longitudinally and laterally.

As a result of this accurate registration of the perforations of the multi-layer film and the support, the perforations of the stripped off layer of the multi-layer film will be in exact registration with the perforations of the transfer film or support so that, if the various supports with their individual stripped emulsion layers are then brought into position with the perforations in exact registration, the various emulsion layers will then be in the same relative positions they occupied on the original multi-layer film, the advantages of which will be apparent to workers in the art.

To secure the desired tension, certain of the registering sprockets are braked and are driven solely by the movement of the film strips thereover so as to act as a hold back on the two strips. These braked registering sprockets will be submerged in water through which the two films pass during a portion of the registering operation. Others of the registering sprockets are positioned in advance or above the braked sprockets and are suitably driven, one being positively driven while the others are frictionally or tendency driven at a speed slightly greater than the positively driven sprocket, and tending to carry the films from the positively driven sprocket and faster than the latter will permit. These tendency driven sprockets thus serve to retain the tension of the film during its passage over the driven sprockets. The positively driven and tendency driven sprockets also cooperate with the braked sprockets to impart the necessary stretch or tension to the two film strips to bring the two rows of perforations of the two strips into exact longitudinal registration. It is apparent, of course, that the shorter of the two strips is the one that will receive the stretch or tension. The tendency driving force should not, however, exceed the braking effect of the lower sprockets. The two groups of sprockets must, however, impart sufficient tension to the films to take care of the maximum differences in the perforation pitches.

The main purpose for the multi-sprocket arrangement is to distribute the tension over more teeth than would be possible with a single sprocket. Thus greater shrinkage differences between the two films can be handled. Also the use of the multi-sprocket assembly serves to spread the strain, which is carried on the shorter film, over a larger number of film perforations so that sufficient tension may be applied to the two films to bring the two rows of perforations into exact longitudinal registration without damaging the perforations, the advantages of which will be apparent to those in the art.

The expansible teeth function, during the passage of the two films thereover, to secure the lateral registration of the films, all of which will be hereinafter more fully described. During the passage of the two films from the braked to the driven sprockets, the point at which the tension is the greatest, the strips are rolled down between a pair of roll-down rollers to remove all excess liquid from between the strips and to bring the strips into intimate contact. The adhesion between the gelatin substratum of the transfer film or support and the emulsion to be stripped from the multi-layer film unites the two strips together. This adherence is sufficient to maintain the registration of the two strips after the latter leaves the registering sprockets, but is not sufficient to fully bond the films for stripping.

The present invention has, therefore, as its principal object the provision of a mechanism by which the exact registration of two film strips, having somewhat different perforation pitches, is secured by means of their perforations only.

To these and other ends, the invention resides in certain improvements and combinations of parts, all as will be hereinafter more fully described, the novel features being pointed out in the claims at the end of the specification.

In the drawing.

The same reference numerals throughout the various views indicate the same parts.

While the structure shown in the drawing and to be later described is primarily designed for use in connection with the film stripping method of the type shown and described in my copending application 488,672, it has a wide range of other applications. It is to be understood that the apparatus embodying my invention is applicable wherever accurate positioning of a motion picture film by its perforations is desirable, as in contact or projection printers, film laminating or cementing apparatus, color cameras, or other apparatus, as well as the apparatus to be later more fully described. Where in the claims I use the term "photographic apparatus," I intend thereby to include all such apparatus. This invention is not, therefore, intended to be limited except insofar as is necessitated by the prior art and the scope of the appended claims.

As the present invention relates more specifically to registration of the two film strips by means of the perforations, only so much of the mechanism as is necessary to a complete understanding of the present invention will be illustrated and described. Reference may be had to the above-mentioned copending applications for a full disclosure of the complete method and additional apparatus used in connection therewith.

The transfer film or support 11 and a multilayer film 12, a layer of which is to be transferred to the support 11 in the manner described in my copending application, are each provided with rows of perforations 13 and 14 arranged adjacent the marginal edges thereof, in a manner well known to those in the motion-picture film art.

As shown in the above-mentioned Patent 2,367,665, the transfer film 11 comprises a subbing layer carried by a transparent base, while the multi-layer film 12 is formed with a transparent backing or support on which are positioned three color-sensitive emulsion layers separated by suitable stripping layers. A color filter layer is positioned between the two top color emulsion layers. As the construction of this film does not form a part of the present invention, details therefore are not deemed necessary, but reference may be had to Patent 2,367,665 for the structural details of the film.

The film strips 11 and 12 are delivered from a suitable conditioning chamber, such as shown in my copending application 488,672 and are passed to the first lower registering sprockets 22, the film 11 first passing over the weighted floated roller 15 while the film 12 is positively fed by a driven sprocket 26 to a weighted floating roller 18 from which it passes to the sprocket 22. From the first registering sprocket 22, the two films pass together over the other registering sprockets, which serve to bring the film into exact longitudinal and lateral registration. In order to insure the correct registration of the film perforations, it is imperative that the two films be moved in a straight line during the registration and the roll down operations. If the films are moved over a curved surface during such registration, they will be out of registry due to differences in the diameters of the paths followed by the two films.

Figure 1:
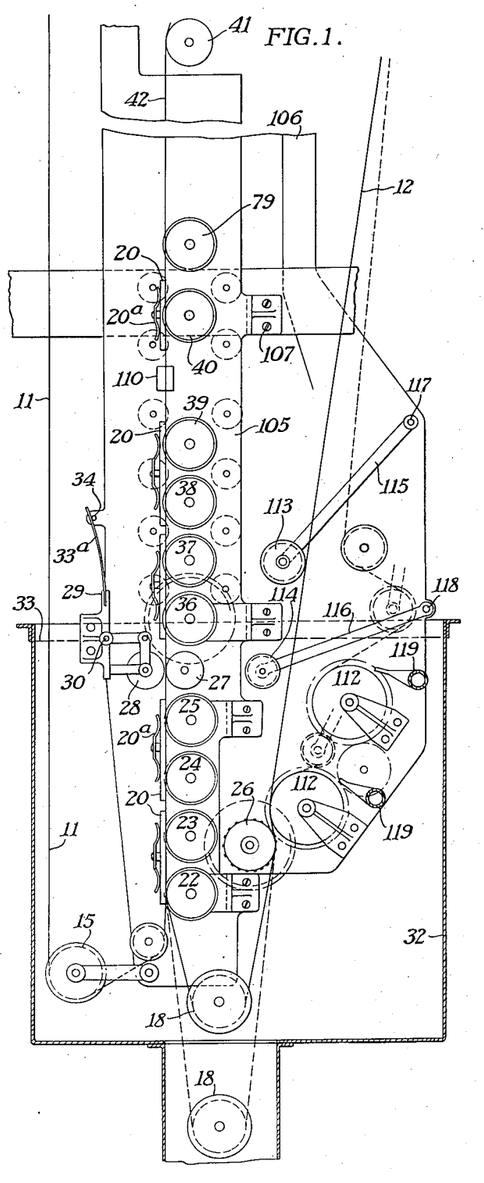
Fig. 1 is a side view, largely diagrammatical, of one form of a film registering and roll-down mechanism assembly constructed in accordance with the present invention.
Figure 5:
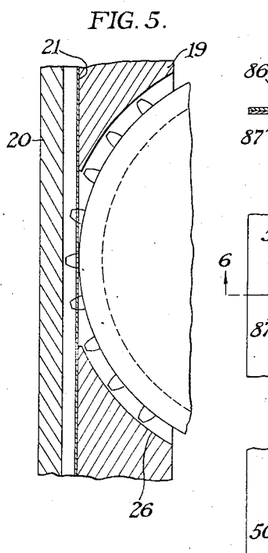
Fig. 5 is a longitudinal sectional view of the film guide and stripping member, showing the relation thereto of one of the registering sprockets.

To insure this straight line movement the present invention provides a straight guide-track which moves the films in a straight line during the registering operation, and which also functions to strip the two films from the film sprockets. This guide-track comprises a fixed plate 19 which cooperates with movable plates 20 hingedly connected to the plate 19 and cooperating with the latter to form a shallow channel 21 through which the films 11 and 12 move, with only a running clearance and in a straight line, past and substantially tangentially to a plurality of lower registering sprockets 22, 23, 24, and 25. The fixed plate 19 is provided with a cut-out portion 26 at each sprocket, see Fig. 5, to permit the passing of the sprocket teeth therethrough to engage the films 11 and 12 to bring the perforations thereof into exact registration. The plates 19 and 20 and the lower registering sprockets 22 to 25 are positioned in a tank 32 which is filled with water or other suitable liquid to the level indicated by the line 33. To facilitate threading of the apparatus, the movable plate 20 is formed in two parts, as shown in Fig. 1, each part being releasably held in cooperating relation with the fixed part of the member 19, as by a pressure plate 20ª. By means of this arrangement the two films 11 and 12 are guided in a straight line, with the perforations 13 and 14 in approximate registration, over the sprockets 22 to 25, to bring the perforations into exact registration both longitudinally and laterally, as will be later more fully described.

After the films have been properly registered on the lower sprockets 22 to 25, the films pass between a pair of roll-down rollers 27 and 28 which serve to remove all excess liquid from between the films and to bring the two films into intimate contact so that the gelatin substratum on the transfer film 11 will adhere to the outer emulsion layer on the multi-layer film 12 to adhesively join the two films together. To insure the proper roll down, the roll-down rollers are preferably positioned at the point of maximum tension of the films, which point is between the lower braked rollers and the upper positively and tendency driven rollers, as shown in Fig. 1. The roller 27 is preferably fixed while the roller 28 is movable to facilitate threading of the apparatus. To this end, the roller 28 is carried by one end of an arm 29 pivoted at 30 to the plate 105 which carries the sprocket assemblies, as later described. The other end of the arm 29 has secured thereto a leaf spring 33ª the free end of which engages and is flexed by a fixed pin 34 carried by the plate 105 to tension the spring 33ª and hold the roller 28 firmly against the two films.

The adhered registered films 11 and 12 then pass upwardly to a second portion of the guide track which is identical to that already described, the corresponding parts being designated by the same numerals. The two films then pass over upper film registering sprockets, 36, 37, 38, 39 and 40, which cooperate with the lower braked sprockets 22 to 25, as will be later pointed out, to secure the longitudinal and lateral registration of the film strips 11 and 12. The upper sprockets, as well as the upper guide track, are preferably positioned above the level 33 of the liquid in the tank 32, as shown in Fig. 1. The upper sprocket 40 is preferably spaced from the sprocket 39 so as to permit the insertion of an air squeeze 110 which serves to remove surface moisture from the exposed surfaces of the films 11 and 12. As such an air squeeze forms no part of the present invention, the details thereof are not shown. Reference may, however, be had to my Patent No. 2,289,753, granted July 14, 1942, which shows such a squeeze. After the two film strips have been thus registered and adhered, they pass to a positively driven sprocket 41 positioned a substantial distance from the upper tendency-driven sprocket 40. The sprocket 41 is driven at the same effective speed as the sprocket 36 so as to act as a hold back on the stripping and drying mechanism, not shown, positioned beyond the sprocket 41, to prevent the driving means of said mechanisms from exerting any pull on the portion 42 of the film strips between the sprocket 41 and the upper registering sprocket 40, which might tend to disrupt or alter the registration of the two films secured by the passage thereof over the registering sprockets. The portion 42 is, therefore, not pulled tightly, but, on the contrary, is somewhat loose, thus assuring the maintenance of the film registration and providing a bonding period during which the films may become adhered well enough to enable them to pass, without being disturbed, during the balance of the bonding period. Thus when the films reach the sprocket 41 they are sufficiently adhered to maintain the perforations in exact registration but not sufficiently bonded to prevent stripping.

Figure 7:
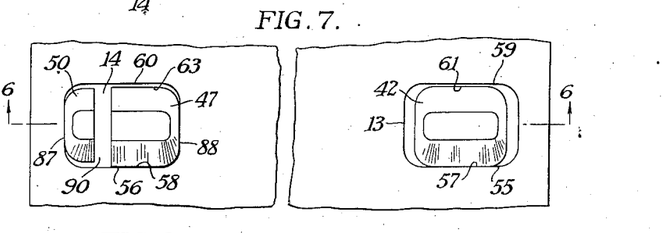
Fig. 7 is a top fragmentary view of a portion of the film strip, showing the relation thereto of the two rows of sprocket teeth and one of the braked sprockets.

As mentioned above, longitudinal and lateral registration of the two films 11 and 12 is secured by bringing the approximately registered perforations into exact registry during the passage of the two strips over the lower sprockets 22 to 25 and the upper sprockets 36 to 40. As each of these sprockets is identical in structure, only one will be described in detail, and the corresponding other sprockets will be designated by the same numerals. Each sprocket comprises a row of properly pitched teeth 42a, and a similarly pitched row of laterally expansible teeth 43. The teeth 42a are solid, and are slightly smaller than the perforations 13, as shown in Fig. 7, and are carried by a disk 44 pinned at 46 to the shaft 45. Each of the teeth 43, on the other hand, is made in two parts which are relatively movable laterally to expand and fill the perforations 14 laterally to bring these perforations of the two strips 11 and 12 into exact lateral registration. Each tooth 43 comprises a fixed portion 47 carried by a web or frame 48 preferably formed integral with the disk 44, see Fig. 4, and a laterally movable portion 50 carried by a web or frame 51 splined to the shaft 45 for movement axially therealong. It is thus seen that each of the registering sprockets is made up of two parts, namely the integral webs 44 and 48 pinned at 46 to shaft 45 and carrying the teeth 42a and the fixed portions 47 of the teeth 43 respectively, and a disk 51 splined to the shaft 45 and carrying the movable teeth portions 50 which are movable laterally relative to the fixed or stationary portions 47 to bring the perforations 14 along one edge of the films 11 and 12 into registration to register the films laterally along one edge.

Figure 8:
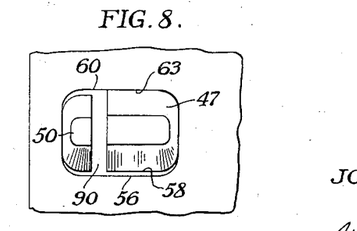
Fig. 8 is a top fragmentary view of a portion of the film strip on an upper driven sprocket, showing the relation of the films, and one of the two-part expansible teeth.

The longitudinal registration of the perforations 13 and 14 of the films 11 and 12 is secured by pulling or tensioning the film strips during the passage of the latter over the upper and lower registering sprockets. Such tensioning serves to stretch the films, particularly the shorter, to bring the rear edges 55 and 56 of the perforations 13 and 14 to a definite stop against the rear faces 57 and 58 of the teeth 42a and the toothed portions 47 of the lower registering sprockets 22 to 25, as shown in Fig. 7, while the front edges 59 and 60 are simultaneously brought to a definite stop against the front faces 61 of the solid teeth 42a and the front faces 63 of the portions 47 of the upper sprockets 36 and 40, as partially shown in Fig. 8. Thus the rear edges of the sprocket teeth of the lower sprockets engage the rear edges of some of the film perforations 13 and 14, while the front edges of the teeth of the upper sprockets engage the front edges of other perforations to stretch the films to bring the two rows of perforations into exact longitudinal registration. As mentioned above, this tension will bring into exact longitudinal registration the perforations of the two strips which may have slightly different longitudinal perforation pitches, the shorter of the two films receiving the stretch.

Figure 3:
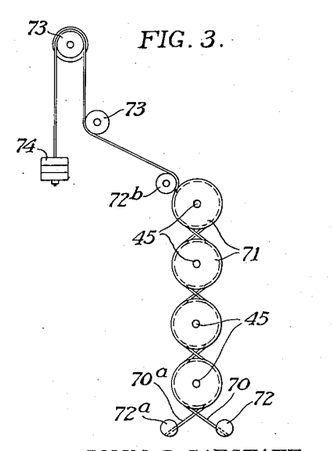
Fig. 3 is an end elevation of the lower registering sprockets, showing the braking mechanism therefor.

In order to tension the films to secure the longitudinal registration of the perforations, the lower sprockets 22 to 25 are braked, and tend to hold back on the two films during the passage thereover, while the upper sprockets 36 to 40 are driven and feed or pull the two films 11 and 12 upwardly, as viewed in Fig. 1. This combined hold-back, and feed serves to stretch or tension the film between the two groups of sprockets, as pointed out above, the roll-down being positioned between the two sets of sprockets or at a point of maximum film tension. The hold-back of the lower sprockets comprises in part, a belt 70 wound in a sinuous path over pulleys 71 carried by the shafts 45 of the lower sprockets, 22 to 25, as shown at Fig. 3. One end of the belt 70 is anchored at 72 while the other end passes over idle guide rollers 73 and has connected thereto weights 74 or other suitable tensioning means which serve to tension the belt 70 to hold the latter in braking relation with the various pulleys 71 to impart the desired braking or hold-back action on the lower sprockets 22 to 25. In order to balance the braking effect on pulleys 71, a second belt 70a is wound over the pulleys in a sinuous path opposite to that of the belt 70, as shown in Fig. 3. The lower end of the belt 70a is anchored at 72a while the upper end passes over an idler 72b and then follows the path of belt 70 to the weight 74. The belts 70 and 70a thus cooperate to apply an even braking effect on pulleys 71 of the sprockets 22 to 25.

Figure 2:
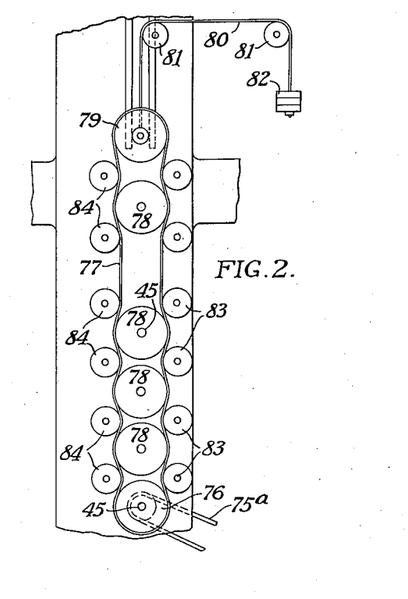
Fig. 2 is an end elevation, of the upper driven registering sprockets of such a mechanism, showing the relation of the positively and tendency driven sprockets and the drive mechanism therefor.

While the lower registering sprockets are braked, the upper sprockets 36 to 40 are driven to pull the two registering films over the sprockets to register the perforations 13 and 14 longitudinally. To secure this result, the shaft 45 of the sprocket 36 is connected by a sprocket and chain 75 and 75a or other suitable means, to the driving mechanism, not shown, to drive the sprocket 36 positively. The shaft 45 of the sprocket 36 has mounted thereon a pulley 76 over which is wrapped an endless driving member in the form of a belt 77 which engages pulleys 78 carried by the shafts 45 of the upper sprockets 37, 38, 39, and 40, as best shown in Fig. 2. The belt 77 is looped over a take-up pulley 79 which is connected by a cord 80 passing over the idler pulleys 81 and carrying a suitable tensioning means such as a weight 82. The belt 77 is thus driven from the sprocket 36 and engages the pulley 78 of each of the sprockets 37, 38, 39, and 40 to drive the latter, it being understood that the pulleys 78 have the same relative position as the pulley 71 shown in Fig. 4. A set of rollers 83, positioned on one run of belt 77 cooperate with another set of rollers 84 positioned on the other run of the belt to hold the belt at the desired tension and in driving relation with the pulleys 78, either or both sets of rollers may be adjustable to secure the proper belt tension. Also, the pulleys 78 are slightly smaller than the pulley 76 so that the belt 77 tends to drive sprockets 37, 38, 39, and 40 slightly faster than the sprocket 36. Thus the latter is positively driven while the sprockets 37, 38, 39, and 40 are tendency driven and at a slightly excess speed, and tend to move the registered films away from the sprocket 36 at a speed slightly faster than fed by the sprocket 36 to maintain the films under the proper tension as they pass over the upper sprockets. These upper driven sprockets 36 to 40 thus cooperate with the submerged braked sprockets 22 to 25 to tension the two films longitudinally to bring both rows of perforations 13 and 14 into exact longitudinal registration during their continuous passage in a straight line over the sprockets.

Figure 6:
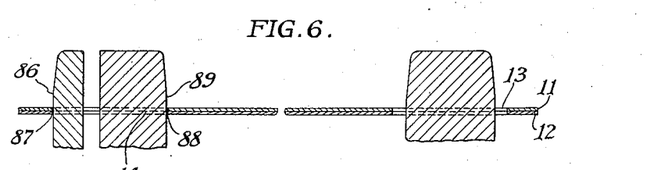
Fig. 6 is a sectional view taken substantially on line 6—6 of Fig. 7, showing the relation of the sprocket teeth and the two film strips during the registering operation.

As films tend to have a greater variation laterally than longitudinally between the center lines of the perforations, it is preferred to secure the desired lateral registration by use of only one row of teeth of the sprockets. In the present embodiment, only the expansible teeth 43 are utilized for the lateral registration, the teeth 42ᵃ being made slightly narrow than the film perforations 13, as shown in Figs. 6 and 7, to permit the slight lateral adjustment necessary to bring the film perforations 14 of the two strips into exact lateral registration. To secure this result, the disk 51 is movable laterally, or to the left as viewed in Fig. 4, by a coil spring 85 interposed between the disks 48 and 51. The spring 85 serves to move the disk 51 and the movable toothed portions 50 to the left until the outer edges 86 of the portions 50 engage the outer edges 87 of the perforations 14. Such engagement serves to bring the inner edges 88 of the perforations to a definite stop against the inner faces 89 of the portions 47, as shown in Figs. 6 and 7. Thus the fixed or stationary portions 47 of the teeth cooperate with the laterally movable portions 50 to fill the perforations laterally except for the slight clearance 90 between the two portions, thus bringing the perforations 14 into registration laterally along one edge of the film. As there is no transverse stretch applied to the films, it has been found that the satisfactory lateral registration can be secured by lateral registration of only one row of perforations. However, as there is no great force, only that of spring 85, exerted in securing this lateral registration, it is desirable to start such registration as the two films move onto the first registering sprocket 22. There is also a mild amount of longitudinal registration at the sprocket 22, as will be apparent.

Figure 4:
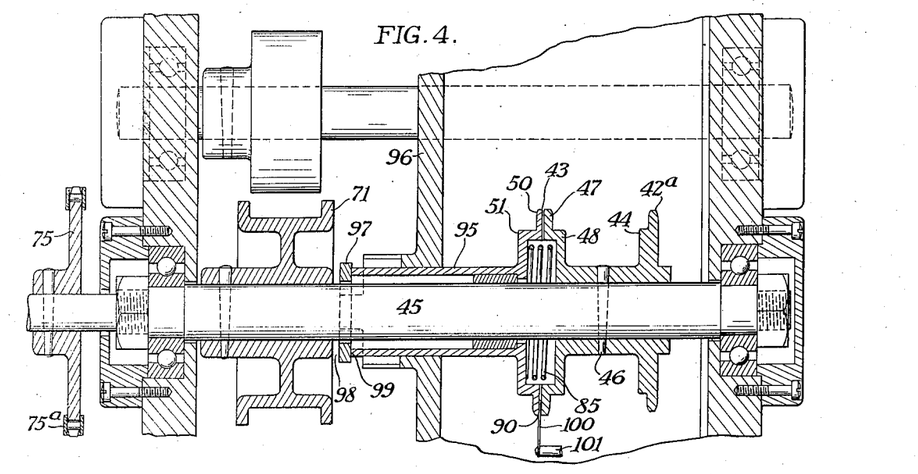
Fig. 4 is a sectional view through one of the registering sprockets, showing the relation of the sprocket parts and the control means therefor.

During such registration, however, it is imperative that the disk 51 and toothed portions 50 be prevented from tipping so as to insure that the part of the edge 86 of the tooth portion 50 which engages the perforation edge 87 is maintained normal to the shaft 45 and the film perforated edge 87. For this reason, the shaft 45 extends for a substantial distance to the left beyond the disk 51, as shown in Fig. 4, and has splined thereto a sleeve 95 connected to or formed integral with the disk 51. This sleeve acts as an elongated bearing which prevents tipping of the disk 51 and, hence, the movable toothed portions 50. This spline connection allows the sleeve 95, disk 51, and toothed portions 50 to move laterally relative to the toothed portions 47, under the action of spring 85, but prevents relative rotation of the toothed portions 47 and 50. In order to limit the expanding movement of the toothed portions 50 when no film is in engagement therewith, a fixed bifurcated stop 97 extends down into the space 98 between the end 99 of the sleeve 95 and the pulley 71, or the pulley 78, see Fig. 2. This stop 97 limits the endwise or lateral movement of the members 50 so that the latter will be in position to engage positively the edge 87 of the largest film perforations which will be encountered. However, when a smaller perforation is met, the portions 50 will be moved slightly to the right by the film perforation itself, against the action of the spring 85 to bring the edges 86 of the portions 50 into engagement with the outer edges 87 of the perforations to align the latter laterally. The stop 97 thus provides a means for limiting the expanding movement of the teeth portions 50.

In order to insure the proper functioning of the laterally movable teeth portions 50, it is imperative that the clearance space 90 be kept free from any particles, such as pieces of emulsion, dirt, or film, etc., which may find their way thereinto. I, therefore, provide a thin blade 100 the free end of which projects into the space 90 to effectively remove any particles therefrom. The blade 100 is of a thickness less than a minimum clearance 90 between the toothed portions 47 and 50 so as in no way to interfere with the functioning of the parts. The blade 100 is fixed to a part 101 mounted on the mechanism frame in any suitable manner.

It is desirable to mount the sprocket assemblies so that they may be detached from the apparatus as a unit for repairs or replacement. To this end, the various registering sprockets 22 to 25, and 36 to 40, with their various controls and drives, as well as the guide track, roll-down rollers and squeegee are all mounted, as a unit, on a plate 105 depending from and secured to the portion of the machine frame 106 by any suitable fastening means such, for example, as bolts 107. By removing the bolts 107, the entire sprocket assembly may be removed as a unit with the plate 105 without in any way interfering with the relation of the various sprocket mechanisms and their drives. Of course, the shaft 45 of the pulley 36 must first be detached from the drive chain 75ᵃ. This may be accomplished by any suitable and well-known detachable connection.

From the above description it is apparent that the drive sprockets 36 to 40 cooperate with the braked sprockets 22 to 25 to pull or tension the two film strips 11 and 12 longitudinally to bring the front and rear edges of the perforations 13 and 14 to a stop against the front and rear faces respectively and the teeth 42ᵃ and the toothed portions 47 of the teeth 43 of the upper and lower sprockets respectively to register longitudinally both sets of perforations 13 and 14. Thus both rows of sprocket teeth 42ᵃ and 43 cooperate to secure the longitudinal registration along both edges of the film strip. Simultaneously with such longitudinal registration, the laterally movable toothed portions 50 cooperate with the fixed toothed portions 47 to register the two films laterally along one edge thereof. Thus the films are brought into exact registry longitudinally and laterally during the passage over the registering sprockets 22 to 25, and 36 to 40. Between these groups of sprockets, the registered films pass between the roll-down rollers 27 and 28 which serve to remove any excess liquid between the films and to bring the films into intimate contact.

After the films leave the upper sprocket 40 they remain firmly pressed together in registered relation. As the portion 42 of the strips between the sprocket 40 and the drive sprocket 41 is somewhat loose, the films are retained in a registered relation until they reach the sprocket 41 at which time they will become firmly adhered in registering relation but not sufficiently bonded for stripping. The registered films then pass from the sprocket 41 to the bonding path and onto the stripping and drying apparatus, shown in my copending application 488,672.

After the first emulsion layer has been stripped off the multi-layer film 12 and transferred to film 11, as above described, the film 12 is again fed through the apparatus so that the second emulsion layer may be similarly stripped off and transferred to a second transfer film or support 11. As mentioned above and shown in the Patent 2,367,665, the strippable color emulsion layers are separated by an intermediate stripping layer. After the first emulsion layer has been stripped off, some or all of this stripping layer may remain on the exposed surface of the second emulsion layer. It is desirable to remove this stripping layer prior to the transfer of the second emulsion layer to the second film 11. Therefore, during the second passage of the film 12 through the apparatus, the film is preferably moved into engagement with a pair of suitably covered driven cleaning rollers 112 which effectively remove the stripping layer. To secure such movement, a pair of rollers 113 and 114 engage the film 12 and move the latter into engagement with the cleaning rollers, as shown in dotted lines in Fig. 1. The rollers 113 and 114 are carried by the ends of arms 115 and 116 pivoted at 117 and 118, respectively. When the film 12 is moved through the machine the first time, the rollers 113 and 114 are moved about the pivots 117 and 118 to an inoperative position, as shown in full lines in Fig. 1. The film strip 12 then passes along the path, indicated by the full line, directly to the sprocket 26, thus by-passing the cleaning rollers 112. When, however, the film 12 is passed through the second time, the rollers 113 and 114 are moved to shift the film 12 to the position shown in the broken line, Fig. 1, to bring the film into rubbing engagement with the cleaning rollers 112 which remove the stripping layer. Spray jets 119 are provided for keeping the rollers 112 clean.

The above-described apparatus is primarily designed for use in connection with a multi-layer film 12 the color layers of which are transferred successively to separate supports such as the films 11. It is apparent, however, that such registration of films by means of perforations is also admirably adapted for use in cementing two films which are to be permanently joined with their perforations in exact registry. In such a case, a layer of cement could be applied to one or both of the films prior to their passage to the lower registering sprocket 22. Also, if desired, a suitable projection gate could be positioned between the sprockets 40 and 41, and the registered films could be projected and printed.

It will now be apparent from the above description that the present invention provides an arrangement for securing the proper longitudinal and lateral registrations of the two films by means of their perforations only, irrespective of variations of the sizes thereof within the tolerance limits set up. Furthermore, such registration is secured automatically while the two films are moving over the registering sprockets. Simultaneously with said registration, the two films are rolled down. After the films have been thus registered and rolled down they pass through an adhering period during their passage over the portion 42 between the registering sprocket 40 and the drive sprocket 41 so that when the two films reach the latter sprocket the emulsion to be transferred becomes sufficiently bonded onto the substratum of the transfer film to effectively retain the films in their registering relation but not sufficiently to permit stripping.

It is to be understood that, while several sprockets having divided teeth are shown arranged in tandem one above and below the rollers 27 and 28, this is to relieve the strain on the edges of the perforations that would occur if only a single sprocket were used at each station. By the use of several sprockets, the pull is divided along the length of the film. It is to be understood that either more or fewer sprockets may be used either for pulling or braking, and further that these sets of sprockets may comprise both ordinary sprockets all the teeth of which are fixed, and sprockets having split teeth such as those here described.

I also contemplate as within the scope of my invention the use of a single split sprocket as the upper or reregistering sprocket, this being by way of a substitution for the single reregistering sprocket in my application No. 488,672.

It is also apparent that with film having perforations along one edge only, the sprocket would have only the split teeth, the teeth 42 being either omitted or not used.

There are two types of film perforations recognized in the motion-picture film art, namely, the Bell and Howell perforation used on negative film, and the Eastman "positive" type perforations. The sprocket-tooth construction of the present invention has been designed for use on the latter.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

The apparatus herein disclosed and claimed is also a specific embodiment of the invention, as to apparatus, claimed generically in my copending application, Serial No. 589,327, filed concurrently herewith, in which application also the sprocket having split teeth is itself claimed.

Having thus described my invention, what I claim is:

1. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, and expansible teeth formed on at least one of said certain sprockets and extending through aligned perforations of said strips to fill said perforations in one direction to register said films.

2. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, means for simultaneously tensioning both of said strips as the latter are moved over said sprockets, and expansible teeth on at least one of said certain sprockets and extending through a pair of aligned perforations of said strip to fill said perforations in one direction to register said perforations in said one direction while said strips are under tension.

3. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, means for registering said strips in one direction, and expansible teeth on at least one of said certain sprockets and filling a pair of aligned perforations of sa'd strips in another direction to register said strips in said other direction.

4. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, and a row of expansible teeth carried by at least one of said certain sprockets, each of said teeth comprising two portions spring pressed apart in one direction to vary the size of said tooth.

5. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, a series of expansible teeth carried by at least one of said certain sprockets and comprising relatively movable parts, means for moving said parts relative to each other in one direction to vary the size of the teeth, and means for limiting said movement to control the size of said teeth.

6. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, certain of said sprockets having two rows of sprocket teeth, the teeth of one row being dimensioned to engage the perforations along one edge of the films, and expansible teeth in the other row, said latter teeth being expansible laterally to fill the perforations laterally along the other edge of the film strip.

7. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, means for tensioning said strips to register the latter longitudinally, movable spring actuated members associated with certain of said sprockets for registering said strips laterally and means for limiting the movement of said members.

8. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, means for tensioning said strips to register the latter longitudinally, movable spring actuated members associated with certain of said sprockets and adapted to engage aligned perforations of said strips to register the strips laterally and means for maintaining said members in a predetermined relation relative to said strips.

9. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, expansible teeth formed on at least one of said sprockets and adapted to extend into aligned perforations of said strips, each of said teeth being formed in two parts, means for yieldably moving said parts relative to each other to register said strips in one direction, and means for limiting the relative movement to said parts.

10. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, expansible teeth formed on at least one of said sprockets and adapted to extend into aligned perforations of said strips, each of said teeth comprising a stationary portion and a movable portion, means for moving said movable portion to register said strips, in one direction, and a stop for limiting the movement of said movable portions.

11. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, expansible teeth formed on at least one of said sprockets and adapted to extending into aligned perforations of said strips, each of said teeth comprising a stationary portion and a movable portion, means for moving said movable portion to register said strips in one direction, and means for preventing tipping of said movable portion.

12. Apparatus for accurately registering two film strips having similarly dimensioned perforations along at least one edge and comprising a series of sprockets over which said strips are arranged to be moved in contacting relation, means for guiding said strips in a straight line relation over certain of said sprockets, expansible teeth formed on at least one of said sprockets and adapted to extend into aligned perforations of said strips, each of said teeth comprising a stationary portion and a movable portion, means for moving said movable portion to register said strips in one direction, means for preventing tipping of said movable portions, and means associated with said last mentioned means for limiting the movement of said movable portions.

13. Apparatus for accurately registering two film strips having similarly dimensioned perforations along at least one border and comprising a first registering sprocket, means for guiding two film strips to and past said sprocket and holding them in registration on the teeth of said sprocket, a second registering sprocket, means for directing said strips from said first sprocket to said second sprocket and pressing them into engagement with the teeth of the latter, one of said sprockets having teeth which are split into two portions spring pressed apart and adapted to register the film strips accurately by engagement with the edges of the perforations.

14. Apparatus for accurately registering two film strips having similarly dimensioned perforations along at least one border and comprising a first registering sprocket, means for guiding two film strips to and past said sprocket and holding them in registration on the teeth of said sprocket, a second registering sprocket, means for directing said strips from said first sprocket to said second sprocket and pressing them into engagement with the teeth of the latter, said second sprocket having teeth which are split into two portions spring pressed apart and adapted to register the film strips accurately by engagement with the edges of the perforations.

15. Apparatus for accurately registering two film strips having similarly dimensioned perforations along their border and comprising a first series of registering sprockets, a second series of registering sprockets, means for guiding two film strips to the first sprockets, means for holding them in registry on the sprocket teeth of all of said sprockets and guiding them past said sprockets, means for braking said first sprockets, means for driving said second sprockets whereby the two films are drawn under tension through the apparatus, at least one of the sprockets of each series of sprockets having teeth to engage one row of perforations, which last mentioned teeth are split into two portions spring pressed apart laterally.

16. Apparatus for accurately registering two strips having similarly dimensioned perforations along their borders and comprising a registering sprocket, means for guiding two film strips to said sprocket and for holding them in registration on the sprocket teeth, a second registering sprocket in line with the first, means for guiding the films in contact from the first sprocket to the second sprocket and holding them in registration on the teeth of the second sprocket, a brake for retarding the first sprocket, means for driving the second sprocket whereby it draws the films under tension past the first sprocket, the teeth of each of said sprockets which engage one row of perforations being split into two portions spring pressed apart laterally.

17. Apparatus for accurately registering two film strips having similarly dimensioned perforations along at least one border thereof and comprising a pair of spaced registering sprockets over which two film strips are adapted to be moved in contacting relation, means for guiding said strips over said sprockets and in engagement with the teeth thereof, means associated with said sprockets for tensioning said strips to register the latter longitudinally, and yieldable means associated with certain of the teeth of said sprockets for registering the strips laterally.

18. Apparatus for accurately registering two film strips having similarly dimensioned perforations along at least one border thereof, and comprising a pair of spaced registering sprockets over which two film strips are adapted to be moved in contacting relation, means for guiding said strips over said sprockets and in engagement with the teeth thereof, means for applying a retarding force to one of said sprockets, means for driving the other sprocket and cooperating with the retarding force to tension said strips to register the latter longitudinally, and laterally expansible teeth carried by at least one of said sprockets for registering said strips laterally.

19. Apparatus for accurately registering two film strips having similarly dimensioned perforations along at least one border thereof, and comprising a pair of spaced registering sprockets over which two film strips are adapted to be moved in contacting relation, means for guiding said strips over said sprockets and in engagement with the teeth thereof, means for applying a retarding force to one of said sprockets, means for driving the other sprocket and cooperating with the retarding force to tension said strips to register the latter longitudinally, laterally expansible teeth carried by at least one of said sprockets for registering said strips laterally, and means independent of said expansible teeth for controlling the expansion thereof.

20. Apparatus for accurately registering two film strips having similarly dimensioned perforations along at least one border thereof, and comprising a pair of spaced registering sprockets over which two film strips are adapted to be moved in contacting relation, means for guiding said strips over said sprockets and in engagement with the teeth thereof, means for applying a retarding force to one of said sprockets, means for driving the other sprocket and cooperating with the retarding force to tension said strips to register the latter longitudinally, laterally expansible teeth carried by at least one of said sprockets for registering said strips laterally, and means for maintaining said expansible teeth in a predetermined angular relation.

21. Apparatus for accurately registering two film strips having similarly dimensioned perforations along at least one border thereof, and comprising a pair of spaced registering sprockets over which two film strips are adapted to be moved in contacting relation, means for guiding said strips over said sprockets and in engagement with the teeth thereof, means for applying a retarding force to one of said sprockets, means for driving the other sprocket and cooperating with the retarding force to tension said strips to register the latter longitudinally, laterally expansible teeth carried by at least one of said sprockets for registering said strips laterally, each of said expansible teeth comprising a stationary portion and laterally movable portion, means for sliding said movable portion laterally, and means for limiting said sliding movement.

22. Apparatus for accurately registering two film strips having similarly dimensioned perforations along at least one border thereof, and comprising a series of lower registering sprockets, a series of upper registering sprockets, means for guiding a pair of film strips over said sprockets and in engagement with the teeth thereof, braking means for said lower sprockets, means for positively driving one of said upper sprockets, means controlled by said driven sprockets for yieldably driving the others of said upper sprockets, said driving means cooperating with said braking means to tension said strips to register the latter longitudinally, and laterally expansible teeth on certain of said upper and lower sprockets for registering said strips laterally.

23. Apparatus for accurately registering two film strips having similarly dimensioned perforations along at least one border thereof, and comprising a series of lower registering sprockets, a series of upper registering sprockets, means for guiding a pair of film strips over said sprockets and in engagement with the teeth thereof, a common braking means for all of said lower sprockets, means for positively driving the lower of said upper sprockets, means including an endless belt for yieldably driving the others of said upper sprockets from said positively driven sprocket, said braked and driven sprockets serving to tension said strips to bring the strips into accurate longitudinal registration, and laterally expansible teeth carried by at least one of the lower sprockets and one of the upper sprockets to bring said strips into accurate registration laterally.

24. Apparatus for accurately registering two film strips having similarly dimensioned perforations along at least one border thereof, and comprising a series of lower registering sprockets, a series of upper registering sprockets, means for guiding a pair of film strips over said sprockets and in engagement with the teeth thereof, a common braking means for all of said lower sprockets, means for positively driving the lower of said upper sprockets, means including an endless belt for yieldably driving the others of said upper sprockets from said positively driven sprocket, said braked and driven sprockets serving to tension said strips to bring the strips into accurate longitudinal registration, laterally expansible teeth carried by at least one of said lower sprockets and at least one of said upper sprockets and engaging the perforations along one border of said strips to register the strips laterally, each of said expansible teeth comprising a stationary portion and a laterally movable portion, means for sliding said movable portion laterally, and means for limiting the lateral movement of said movable portions.

JOHN G. CAPSTAFF.

REFERENCES CITED

The following references are of record in the file of this patent:

UNITED STATES PATENTS

| Number | Name | Date |
|---|---|---|
| 1,560,438 | Taylor | Nov. 3, 1925 |
| 1,596,641 | Weaver | Aug. 17, 1926 |
| 1,661,157 | Ball et al. | Mar. 6, 1928 |